US008853976B2

(12) United States Patent
Shin et al.

(10) Patent No.: US 8,853,976 B2
(45) Date of Patent: Oct. 7, 2014

(54) ACTIVE CONTROL TYPE OF VIBRATION ABSORBING DEVICE

(71) Applicant: Korea Institute of Machinery & Materials, Daejeon (KR)

(72) Inventors: Yun Ho Shin, Daejeon (KR); Seok Jun Moon, Daejeon (KR); Young-Chul Huh, Daejeon (KR); Byung Hyun Kim, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 131 days.

(21) Appl. No.: 13/628,211

(22) Filed: Sep. 27, 2012

(65) Prior Publication Data

US 2013/0320887 A1    Dec. 5, 2013

(30) Foreign Application Priority Data

May 31, 2012   (KR) .................. 10-2012-0058098
May 31, 2012   (KR) .................. 10-2012-0058101

(51) Int. Cl.
   *E02D 7/06*   (2006.01)
   *H02K 41/03*  (2006.01)

(52) U.S. Cl.
   USPC ............ 318/126; 318/115; 318/119; 318/135

(58) Field of Classification Search
   USPC ............. 318/115, 119, 126, 135; 267/140.14, 267/140.15; 310/14, 16; 250/491.1
   See application file for complete search history.

(56) References Cited

U.S. PATENT DOCUMENTS

| 5,427,362 | A | 6/1995 | Schilling et al. |
| 6,881,963 | B2 * | 4/2005 | Ito ............... 250/491.1 |
| 7,449,803 | B2 * | 11/2008 | Sahyoun ........... 310/14 |
| 8,395,286 | B2 * | 3/2013 | Xu et al. ........... 310/14 |
| 8,616,536 | B2 | 12/2013 | Kim et al. |
| 8,643,230 | B2 * | 2/2014 | Nakagawa et al. ...... 310/16 |
| 2004/0164253 | A1 * | 8/2004 | Ito ............... 250/491.1 |
| 2007/0241489 | A1 * | 10/2007 | Mizushima et al. ..... 267/140.14 |
| 2008/0106015 | A1 * | 5/2008 | Fushimi et al. ........ 267/140.15 |
| 2009/0020381 | A1 * | 1/2009 | Hindle et al. ........ 188/267 |
| 2011/0180980 | A1 * | 7/2011 | Urayama et al. ....... 267/140.14 |

FOREIGN PATENT DOCUMENTS

| JP | 05-033827 | 2/1993 |
| JP | 06-235438 | 8/1994 |

(Continued)

*Primary Examiner* — Paul Ip
(74) *Attorney, Agent, or Firm* — Lexyoume IP Meister, PLLC

(57) ABSTRACT

The present invention provides a vibration absorbing device. A vibration absorbing device according to an exemplary embodiment of the present invention includes a first magnetic force generation member fixed to an external portion that is separated from a vibration source and a second magnetic force generation member provided in one side of the vibration source. When vibration is generated by the vibration source, the direction and magnitude of a magnetic force of one of the first magnetic force generation member and the second magnetic force generation can be controlled such that the second magnetic force generation member can move in a direction for attenuating the vibration of the vibration source.

11 Claims, 9 Drawing Sheets

(56) References Cited

FOREIGN PATENT DOCUMENTS

| | | |
|---|---|---|
| JP | 10-231886 | 9/1998 |
| JP | 2001-153175 | 6/2001 |
| JP | 2001-182775 | 7/2001 |
| JP | 2002-079178 | 3/2002 |
| KR | 10-2005-0014934 | 2/2005 |
| KR | 10-2005-0066295 | 6/2005 |
| KR | 10-0508599 | 8/2005 |
| KR | 10-0588341 | 3/2006 |
| KR | 10-2007-0052576 | 5/2007 |
| KR | 10-0873662 | 12/2008 |
| KR | 10-2009-0097073 | 9/2009 |
| KR | 10-2011-0139340 | 12/2011 |

* cited by examiner

ACTIVE CONTROL TYPE OF VIBRATION ABSORBING DEVICE

CROSS-REFERENCE TO RELATED APPLICATION

This application claims priority to and the benefit of Korean Patent Application Nos. 10-2012-0058101 and 10-2012-0058098 filed in the Korean Intellectual Property Office on May 31, 2012 and May 31, 2012, the entire contents of which are incorporated herein by reference.

BACKGROUND OF THE INVENTION (a) Field of the Invention

The present invention relates to an active control type of vibration absorbing device.

(b) Description of the Related Art

In generation, vibration causes various mechanical devices to be shaken, and academically vibration means a phenomenon in which a balanced object is iteratively shaken. The vibration pattern of the object may be periodical movement like a pendulum or a non-periodical movement like an earthquake. In particular, when vibration occurs in the object, the object experiences displacement of mass and change in speed, and this means existence of acceleration. In other words, when vibration is applied to the object, a force, that is, a vibration force, is generated and the vibration force affects peripheral objects or supported portions.

In particular, a ship may use an object (hereinafter referred to as a vibration source) that generates vibration in the ship or an upper deck of the ship for realization of various engine facilities and various functional purposes. A pump is an example of a vibration source. Vibration generated by operation of the pump is directly transmitted to each parts of the ship body connected with the pump and thus noise is generated and the ship body is negatively affected. Due to such a reason, the vibration source such as a pump is generally provided with an attenuation means for reducing or absorbing vibration.

FIG. 1 shows a conventional vibration absorbing device. In FIG. 1, a pump P is provided as a vibration source in an upper portion of a ship body S. A plurality of vibration absorbing members 20 are disposed between the ship body S and the pump P. The vibration absorbing members 20 hold the pump P up from a bottom 10 of the ship body S, and function to prevent vibration or impact generated by the pump P from being transmitted to the ship body S by absorbing the vibration or impact.

However, the conventional vibration absorbing member 20 is mostly formed of a rubber material and thus vibration energy transmitted from the pump P is partially attenuated due to a characteristic of the material (e.g., viscoelasticity), and thus the vibration or impact cannot be actively absorbed.

Thus, development on a vibration absorbing device that can feed back vibration in real time and actively absorb the vibration rather than passively attenuating vibration applied from various vibration sources such as a pump is urgently required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a vibration absorbing device that can sense vibration or impact transmitted from a vibration source in real time and actively absorb the vibration.

According to one aspect of the present invention, a vibration absorbing device includes a first magnetic force generation member fixed to an external portion that is separated from a vibration source and a second magnetic force generation member provided in one side of the vibration source. When vibration is generated by the vibration source, the direction and magnitude of a magnetic force of one of the first magnetic force generation member and the second magnetic force generation can be controlled such that the second magnetic force generation member can move in a direction for attenuating the vibration of the vibration source.

The vibration absorbing device may further include a housing disposed in a lower space of the vibration source and having a receiving space formed therein, and the first magnetic force generation member is fixed to the bottom of the receiving space of the housing and the second magnetic force generation member is connected to a mount fixed to a lower side of the vibration source. The first magnetic force generation member may be disposed in the center of the receiving space, and the second magnetic force generation member may be disposed in the exterior circumferential portion of the first magnetic force generation member.

The first magnetic force generation member may be formed in the shape of a circular cylinder, the second magnetic force generation member may be formed in the shape of a ring, and the first magnetic force generation member and the second magnetic force generation member may be disposed on the same center axis.

One of the first magnetic force generation member and the second magnetic force generation member may be a permanent magnet body and the other is a solenoid coil body.

In this case, the vibration absorbing device may include sensor units sensing vibration generated by the vibration source and outputting signals and a controller receiving the signals output from the sensor units as feedback and controlling the magnitude and direction of the current supplied to the solenoid coil body.

The mount may include a supporting member supporting the vibration source and fixing the location of the vibration source and an axis member extended to the second magnetic force generation member from a lower side of the supporting member and coupled to the second magnetic force generation member, and the axis member may be extended to the receiving space side of the housing while penetrating the bottom surface where the vibration source is installed.

In this case, the vibration absorbing device may include a cylinder-shaped moving member having a ring-shaped cross-section, and the moving member is coupled to a lower side of the axis member and having the second magnetic force generation member installed in the interior circumferential surface thereof.

The vibration absorbing device may further include a guide member disposed in the interior circumference side of the housing to guide the moving member that vertically moves through the receiving space.

The vibration absorbing device may include vibration-proof member provided in the mount to absorb vibration generated by the vibration source. The vibration-proof member may be fixed by being inserted between the bottom surface where the vibration source is installed and the axis member.

The vibration-proof member may be formed in the shape of a cylinder of which a cross-section is formed in the shape of a ring to surround the axis member.

In this case, a ring-shaped fixing groove may be formed in the exterior circumferential surface of the vibration-proof member, and one side of the bottom surface may be fixedly inserted to the fixing groove.

The active control type of vibration absorbing device according to the exemplary embodiment of the present invention can sense vibration or impact applied from a vibration source in real time and promptly and actively absorb the vibration or impact.

DESCRIPTION OF REFERENCE NUMERALS INDICATING PRIMARY ELEMENTS IN THE DRAWINGS

Figure 1:
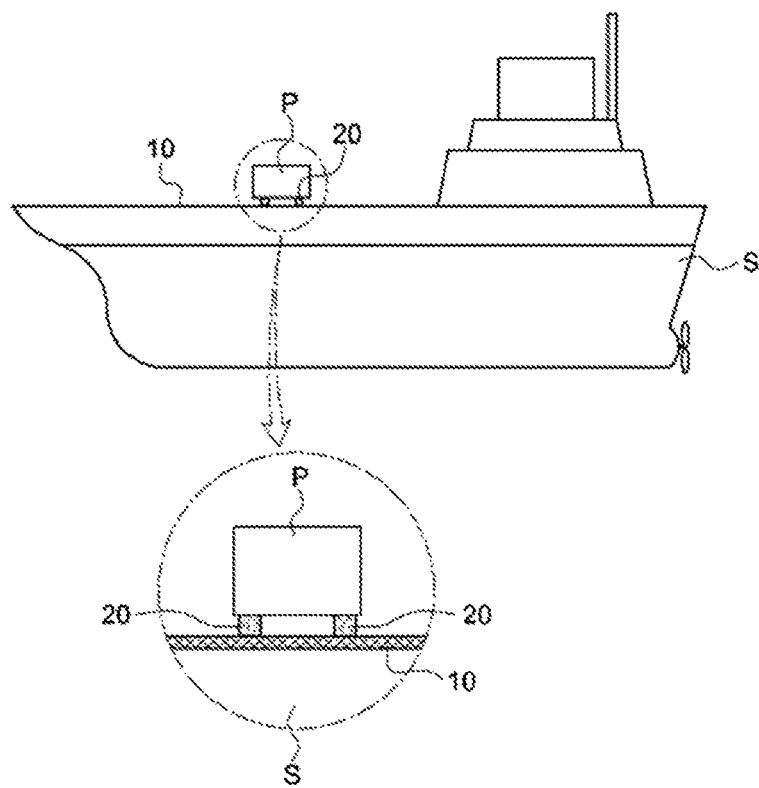
FIG. 1 is a schematic diagram of a conventional vibration absorbing device.

| P: vibration source (or pump) | |
| --- | --- |
| S1, S2: detection signal | C: current control command |
| 10: bottom (or bottom of ship body) | |
| 100: vibration absorbing device | |
| 110: vibration-proof member | 112: fixing groove |
| 120: mount | |
| 122: supporting member | 124: axis member |
| 130: housing | 132: receiving space |
| 134: guide end portion | |
| 140: permanent magnet body | |
| 142: fixing member | 144: permanent magnet |
| 150: solenoid coil body | |
| 152: coil | 154: moving member |
| 160, 160': sensor unit | |
| 170: controller | |

Hereinafter, some exemplary embodiments of the present invention are described with reference to the accompanying drawings in order for those skilled in the art to be able to implement them. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 2:
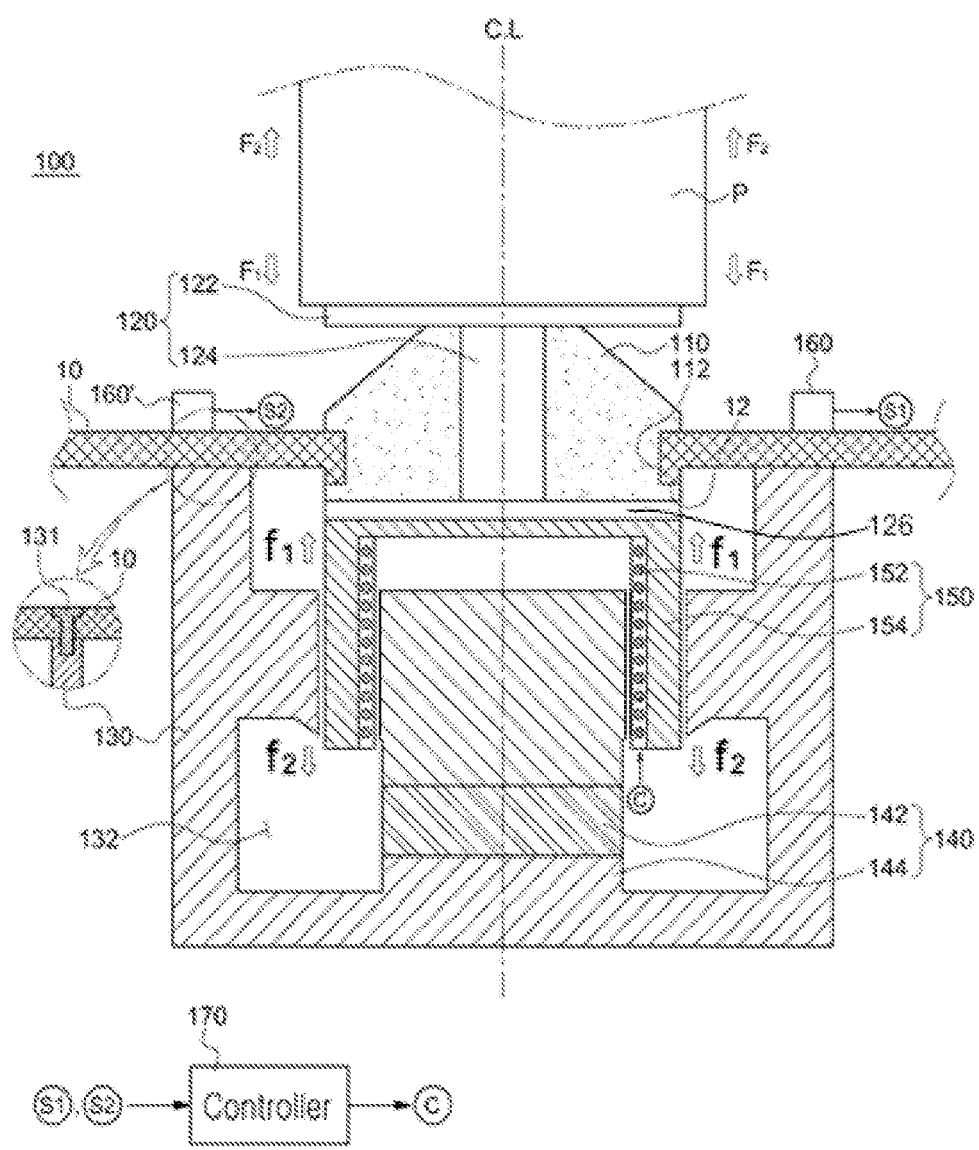
FIG. 2 is a schematic cross-sectional view of an active control type of vibration absorbing device according to a first exemplary embodiment of the present invention.

FIG. 2 is a schematic cross-sectional view of a vibration absorbing device according to a first exemplary embodiment of the present invention.

Referring to FIG. 2, a vibration absorbing device 100 according to the first exemplary embodiment of the present invention includes a housing 130, a first magnetic force generation member, and a second magnetic force generation member. In this case, according to the first exemplary embodiment of the present invention, the first magnetic force generation member may be a permanent magnet body 140 and the second magnetic force generation member may be a solenoid coil body 150.

According to the first exemplary embodiment of the present invention, a direction and a magnitude of a magnetic force of the solenoid coil body 150 are controllable to move the solenoid coil body 150 in an attenuation direction of vibration when the vibration is generated by the vibration source.

Further, the vibration absorbing device according to the exemplary embodiment of the present invention may further include sensor units 160 and 160' sensing vibration generated by the vibration source P and outputting signals, and a controller 170 receiving the signals from the sensor units 160 and 160' as feedback to control a current supplied to the solenoid coil body 150.

In further detail, the housing 130 is an external member disposed in a lower space of the vibration source P and having a receiving space therein.

As shown in FIG. 2, the housing 130 is formed with a concave ("ᄃ") shape in the lower space, and penetrates a bottom 10 where the vibration source P is installed.

In this case, the concave-shaped portion in the housing 130 becomes a receiving space 132. As shown in FIG. 2, the housing 130 is rigidly fixed to the bottom 10 by a fastening bolt 131 and the like.

According to the first exemplary embodiment of the present invention, the solenoid coil body 150 and the permanent magnet body 140 are provided in the receiving space 132 of the housing 130. In further detail, according to the first exemplary embodiment of the present invention, the permanent magnet body 140 is fixed to a bottom surface (in further detail, the center of the bottom surface CL) of the receiving space 132 of the housing 130.

The permanent magnet body 140 includes a fixing member 144 protruding upward from the center of the bottom of the receiving space 132 and a permanent magnet 142 inserted along a horizontal direction to the fixing member 144.

The permanent magnet body 140 generates a magnetic force in a predetermined direction by the permanent magnet 142.

Figure 3:
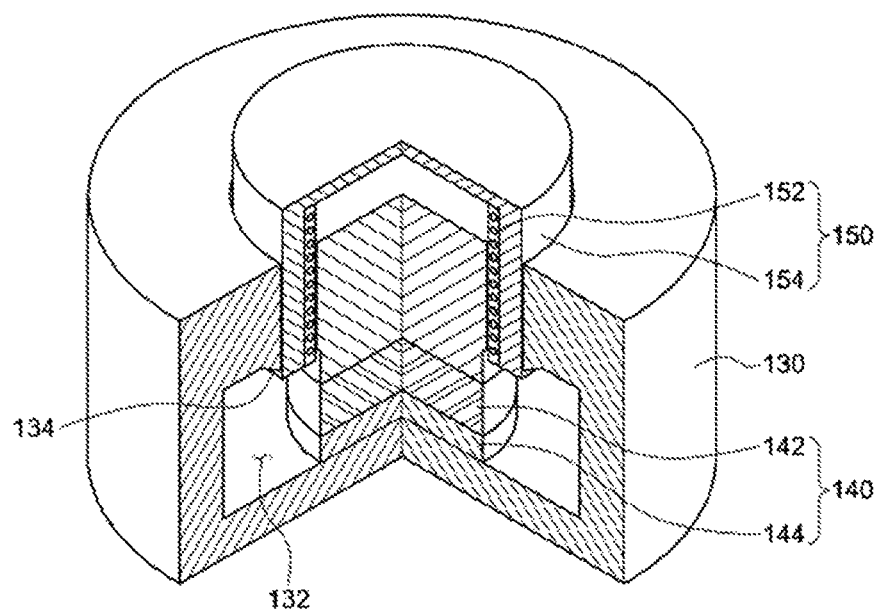
FIG. 3 is a schematic view of an alignment structure of a permanent magnet body and a solenoid coil body in the active control type of vibration absorbing device according to the first exemplary embodiment of the present invention.

As shown in FIG. 2 and FIG. 3, the permanent magnet body 140 may be formed in the shape of a circular cylinder, but the shape of the permanent magnet 140 is not limited thereto.

The solenoid coil body 150 is connected with a mount 120 to which the vibration source P is fixed, and at the same time, is disposed at an outer side of the permanent magnet body 140 in the receiving space 132.

The solenoid coil body 150 generates magnetic forces in different directions and strengths according to control of a current supply.

The magnetic force generated by the solenoid coil body 150 causes a reaction (e.g., attractive force or repulsive force) with the magnetic force generated by the permanent magnet body 140.

When the current supplied to the solenoid coil body 150 is controlled, the solenoid coil body 150 may move in a direction for attenuating vibration of the vibration source P, and accordingly, vibration of the vibration source P coupled to the solenoid coil body 150 can be absorbed.

The solenoid coil body 150 includes a coil 152 generating a magnetic field according to the current supply, and a moving member 154 with the coil 152 installed therein and moving up and/or down through the receiving space from an upper portion of the permanent magnet body 140.

The moving member 154 surrounds the permanent magnet body 140 at a distance from the permanent magnet body 140, and can be movable in an upper direction of the permanent magnet body 140.

The coil 152 is wound in the length direction along an interior circumferential surface of the moving member 154 and thus faces an external circumferential surface of the permanent magnet body 140.

Accordingly, the direction of the current supplied through the coil 152 changes a direction of the magnetic field generated by the solenoid coil body 150.

Figure 4:
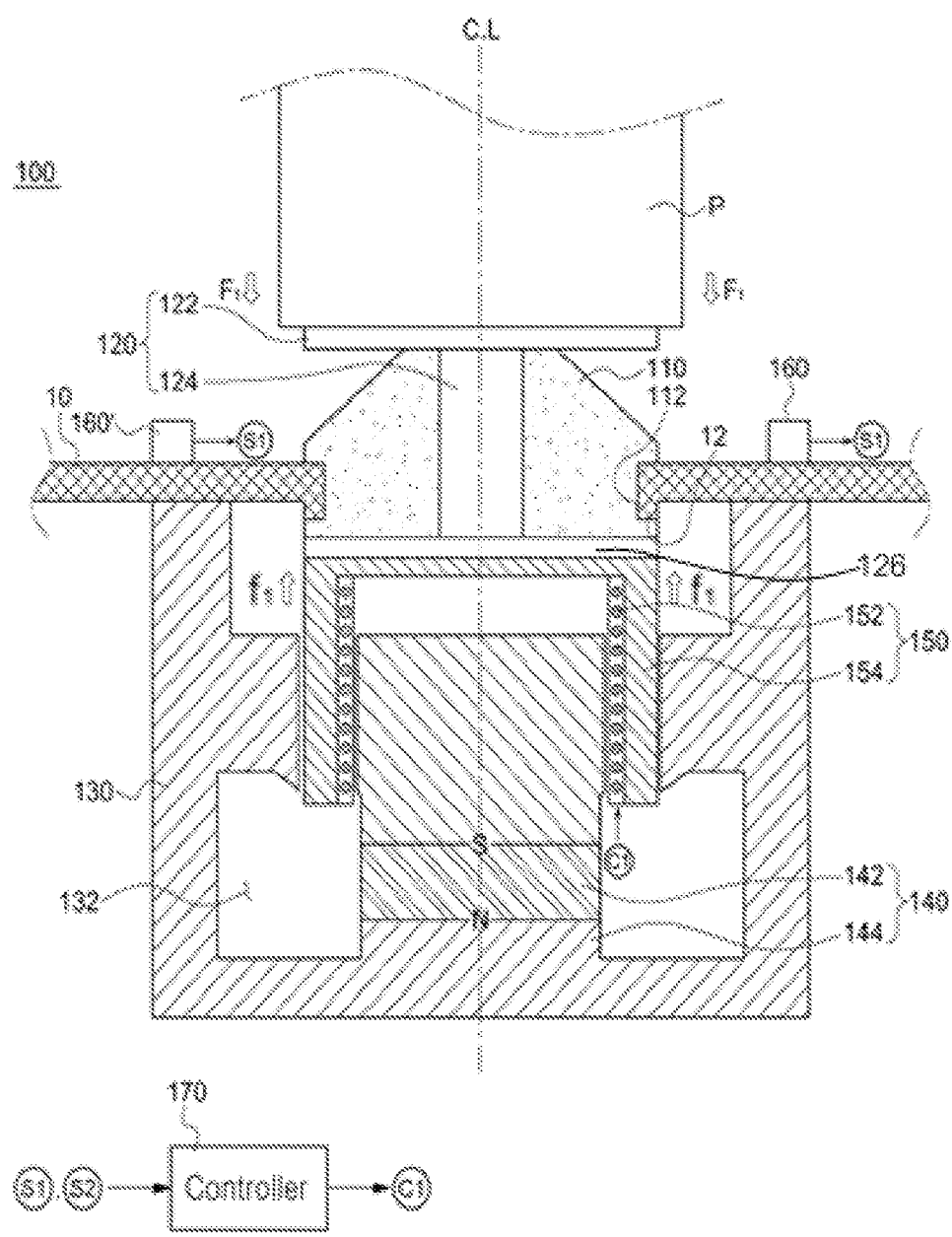
FIG. 4 is a first operation state view of realization of first operation of the active control type of vibration absorbing device according to the first exemplary embodiment of the present invention.
Figure 5:
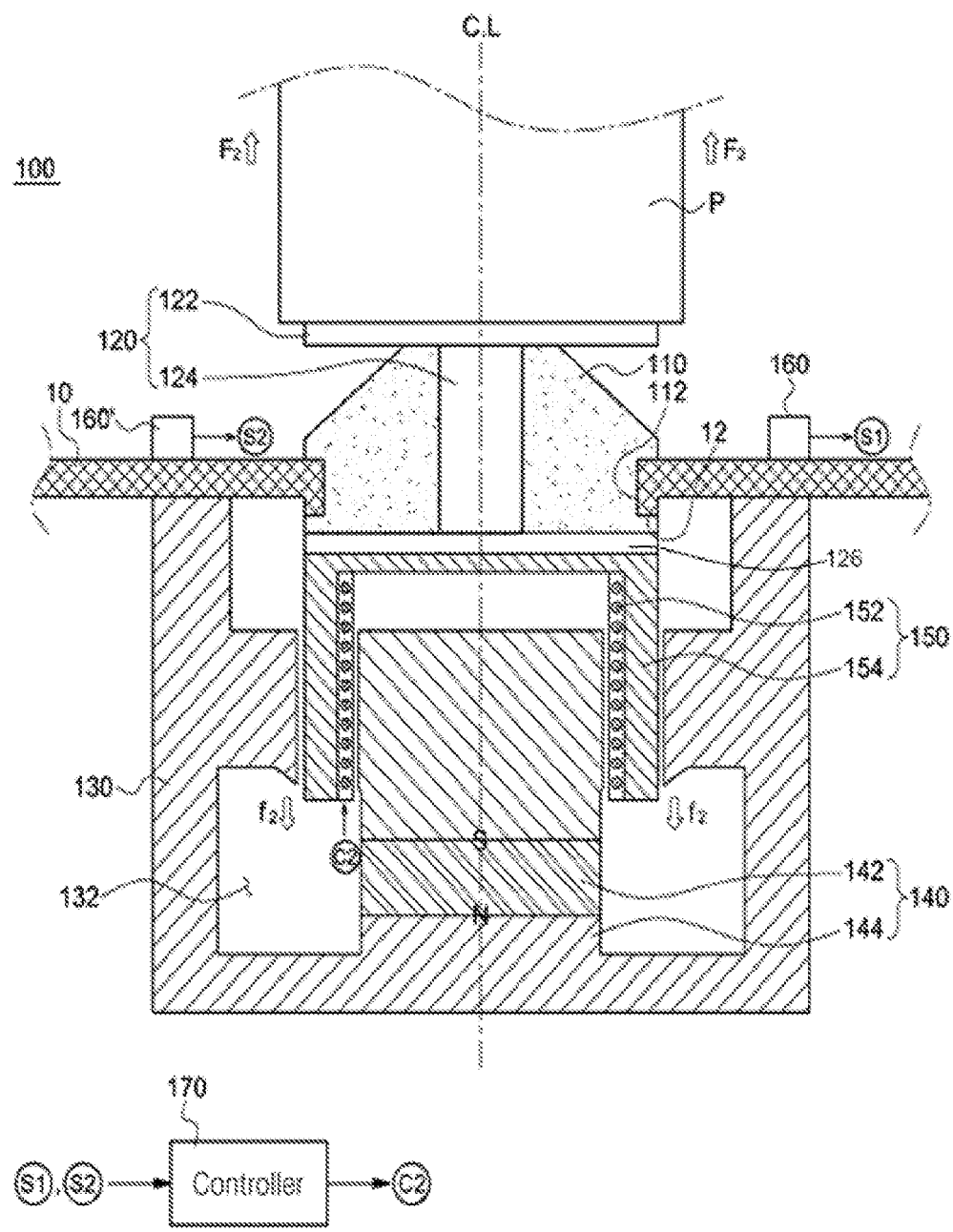
FIG. 5 is a second operation state view of realization of second operation of the active control type of vibration absorbing device according to the first exemplary embodiment of the present invention.

In this case, FIG. 2, FIG. 4, and FIG. 5 exemplarily illustrate the cross-sectional (particularly internal cross-sectional) structure of the moving member 154 and the number of windings of the coil 132 for convenience of description, but they do not limit the scope of the present invention.

As described, the solenoid coil body 150 can be moved upward or downward according to an interaction between the self-generated magnetic force and the magnetic force generated by the permanent magnet body 140.

In further detail, when vibration generated by the vibration source P acts upward from the view of FIG. 2, that is, when F2 is generated, a force (i.e., f2) is generated in the solenoid coil body 150 and thus the solenoid coil body 150 can be able to move downward from the upper portion of the permanent magnet body 140.

On the contrary, when the vibration generated by the vibration source P acts downward from the view of FIG. 2, that is, when F1 is generated, a force (i.e., f1) is generated in the solenoid coil body 150 and thus the solenoid coil body 150 can be able to move upward from the upper portion of the permanent magnet body 140.

As the force is generated in the solenoid coil body 150 in the opposite direction to the direction of the vibration generated by the vibration source P, vibration generated in the vibration source P can be attenuated.

Such a function is use of generation of an attractive force or a repulsive force according to a change in polarity of one of a pair of magnetic forces that face each other.

That is, the direction of the magnetic force generated by the permanent magnet body 140 fixed to the bottom of the housing 130 can be consistent.

On the other hand, the magnitude and direction of the current supplied to the solenoid coil body 150 can change the magnitude and direction of the magnetic force generated by the solenoid coil body 150.

Accordingly, when the vibration of the vibration source P is generated, the vibration of the vibration source P can be absorbed by changing the magnitude and direction of the magnetic force generated by the solenoid coil body 150 in the attenuation direction of the vibration.

As one example, when the upper portion of the permanent magnet 142 having a fixed location in the housing 130 is the S pole and the lower portion thereof is the N pole and a current is supplied along a counterclockwise direction through the coil 152, a magnetic force is generated and thus the lower portion of the solenoid coil body 150 becomes the S pole and the upper portion thereof becomes the N pole.

Accordingly, the force f1 is applied to the solenoid coil body 150 such that the solenoid coil body 150 moves upward, and the force F1 applied from the vibration source P is attenuated using the force f1.

In the opposite case, as previously described, the supply direction of the current supplied through the coil 152 is controlled to be opposite and thus the force f2 is applied to the solenoid coil body 150 to move the solenoid coil body 150 downward and the force F2 applied from the vibration source P is attenuated using the force f2.

Meanwhile, the moving member 154 in the solenoid coil body 150 has to be vertically movable without being shaken to the left and right in the receiving space 132 in the housing 130, and for this, a guide member 134 that guides an ascending and descending path of the moving member 154 is formed in the interior circumferential surface of the housing 130.

The solenoid coil body 150 is fixedly connected with the vibration source P on the center axis C.L of the vibration absorbing device 100, and the mount 120 may be provided between the solenoid coil body 150 and the vibration source P.

An upper end of the mount 120 is fixed to the vibration source P, and a lower end thereof is connected with the solenoid coil body 150 to support the solenoid coil body 150. The mount 20 may include a supporting member 122 and a shaft member 124.

The supporting member 122 is disposed in an upper portion of the bottom 10 of a main facility (e.g., a ship body) to provide a mounting space to which the vibration source P is fixed, and also receives vibration generated by the vibration source P in the early stage.

The shaft member 124 connects the supporting member 122 and the solenoid coil body 150, and more particularly, the upper surface of the moving member 154, and vertically penetrates the bottom 10 of the main facility.

The shaft member 124 transmits vibration transmitted through the supporting member 122 to the solenoid coil body 150.

A vibration-proof member 110 may be further included to primarily absorb vibration generated by the vibration source P. In this case, the vibration-proof member 110 may be formed of a rubber material.

Referring to FIG. 2, the vibration-proof member 110 may be fixed by being inserted between the bottom 10 to which the vibration source P is installed and the shaft member 124.

In this case, the vibration-proof member 110 may be formed in the shape of a cylinder having a circular-shaped cross-section so as to surround the shaft member 124, and an upper side of the vibration-proof member 110 may be formed in the shape of a cone.

The vibration-proof member 110 is formed to absorb vibration using a conventional passive method, and a material and the shape of the vibration-proof member 110 are known to a person in the art and therefore no further description will be provided.

However, the vibration-proof member 110 should be rigidly fixed to the bottom 10 of the main facility (i.e., the bottom of the ship body). For this, it is preferred that the exterior circumference surface of the vibration-proof member is rigidly fixed to the bottom 10. For this purpose, a ring-shaped fixing groove 112 may be provided in a direction along the exterior diameter of the vibration-proof member 110 where it is decreased in the exterior circumferential surface. An end portion (12) of the bottom 10 may be fixedly inserted into the fixing groove 112.

In addition, a support member 126 that supports the vibration-proof member 110 may be provided between a lower side surface of the vibration-proof member 110 and an upper side surface of the moving member 154. In this case, the support member 126 may be combined to the shaft member 124. Accordingly, the vibration-proof member 110 may be disposed between the supporting member 122 and the support member 124.

According to the first exemplary embodiment of the present invention, the vibration absorbing device includes sensor units 160 and 160' for sensing vibration generated by the vibration source P in real time or at predetermined time intervals and outputting signals. In this case, an acceleration sensor may be used as the sensor unit. Here, the acceleration sensor is typically used in the technical field for sensing vibration or impact, and therefore no further description will be provided.

Vibrations (i.e., F1 or F2) sensed by the sensor units 160 and 160' are converted to output signals S1 and S2, respectively, and then transmitted to the controller 170. In the present exemplary embodiment, two sensor units 160 and 160' are provided, but the number of sensor units is not limited thereto.

The controller 170 receives the corresponding output signals S1 and S2 as feedback and applies a control command C to control the current supplied to the solenoid coil body, more particularly, to the coil 152. According to the applied control command C, the direction and magnitude of the current supplied to the coil 152 is controlled and the direction and intensity of the magnetic force generated through the coil 152 are controlled.

Next, attenuation and absorption of vibration generated by the vibration source through the active control type of vibration absorbing device according to the first exemplary embodiment of the present invention will be described in further detail with reference to FIG. 4 and FIG. 5.

FIG. 4 is a first operation state view illustrating realization of first operation of the active control type of vibration absorbing device according to the first exemplary embodiment of the present invention. Here, the first operation is a vibration absorption operation in the case that the force F1 is applied from the top to the bottom.

As shown in the drawing, when the force F1 is applied to the bottom 10 due to vibration generated by the vibration source P, the vibration is partially absorbed through the vibration-proof member 110.

At the same time, the force F1 (i.e., vibration or impact) is sensed through the plurality of sensor units 160 and 160'.

In this case, the sensor units 160 and 160' generate output signals S1 and S2.

The controller 170 receives the output signals S1 and S2 as feedback and applies a control command C1 to set a direction of the magnetic force of the solenoid coil body 150 in a direction for attenuating the vibration.

In this case, the permanent magnet body 140 has already assured the magnetic force so that the upper portion thereof has S polarity and the lower portion thereof has N polarity, and as shown in FIG. 4, when the current is supplied to the right side of the coil 152 by the applied command C1, the solenoid coil body 150 tends to move in the upper direction. That is, the force f1 is generated in the opposite direction to the force F1 generated by the vibration source P. Here, the force F1 and the force f2 are equivalent to each other.

As a result, the vibration transmitted through the bottom 10 can be actively absorbed.

FIG. 5 is a second operation state view of realization of second operation of the active control type of vibration absorbing device according to the first exemplary embodiment of the present invention. Here, the second operation is a vibration absorption operation in the case that the force S2 is applied from the bottom to the top.

As shown in the drawing, when the force F2 is applied toward the bottom 10 due to vibration generated by the vibration source P, the vibration is partially absorbed through the vibration-proof member 110. Simultaneously, the force F2 (i.e., vibration or impact) is sensed through the plurality of sensor units 160 and 160'.

Accordingly, the sensor units 160 and 160' generate output signals S1 and S2.

The controller 170 receives the output signals S1 and S2 as feedback and applies a control command C2 to set the magnetic force direction of the solenoid coil body 150 to a direction for attenuating the vibration.

In this case, the permanent magnet body 140 has already assured the magnetic force so that the upper portion thereof has S polarity and the lower portion thereof has N polarity, and as shown in FIG. 5, when the current is supplied to the left side of the coil 152 by the applied command C2 the solenoid coil body 150 tends to move downward due to the attractive force. That is, the force f2 is generated in the opposite direction of the force F3 generated by the vibration source P. Here, the force f2 is equivalent to the force F2.

As a result, the vibration transmitted through the bottom 10 can be actively absorbed.

Hereinafter, a vibration absorbing device according to a second exemplary embodiment of the present invention will be described with reference to the accompany drawings. In description of the vibration absorbing device according to the second exemplary embodiment of the present invention, only characteristics parts discriminated from the first embodiment will be described and parts whose description is omitted follows the first embodiment, and the same reference numerals as those of the first embodiment are used for the same elements for the sake of explanation.

Figure 6:
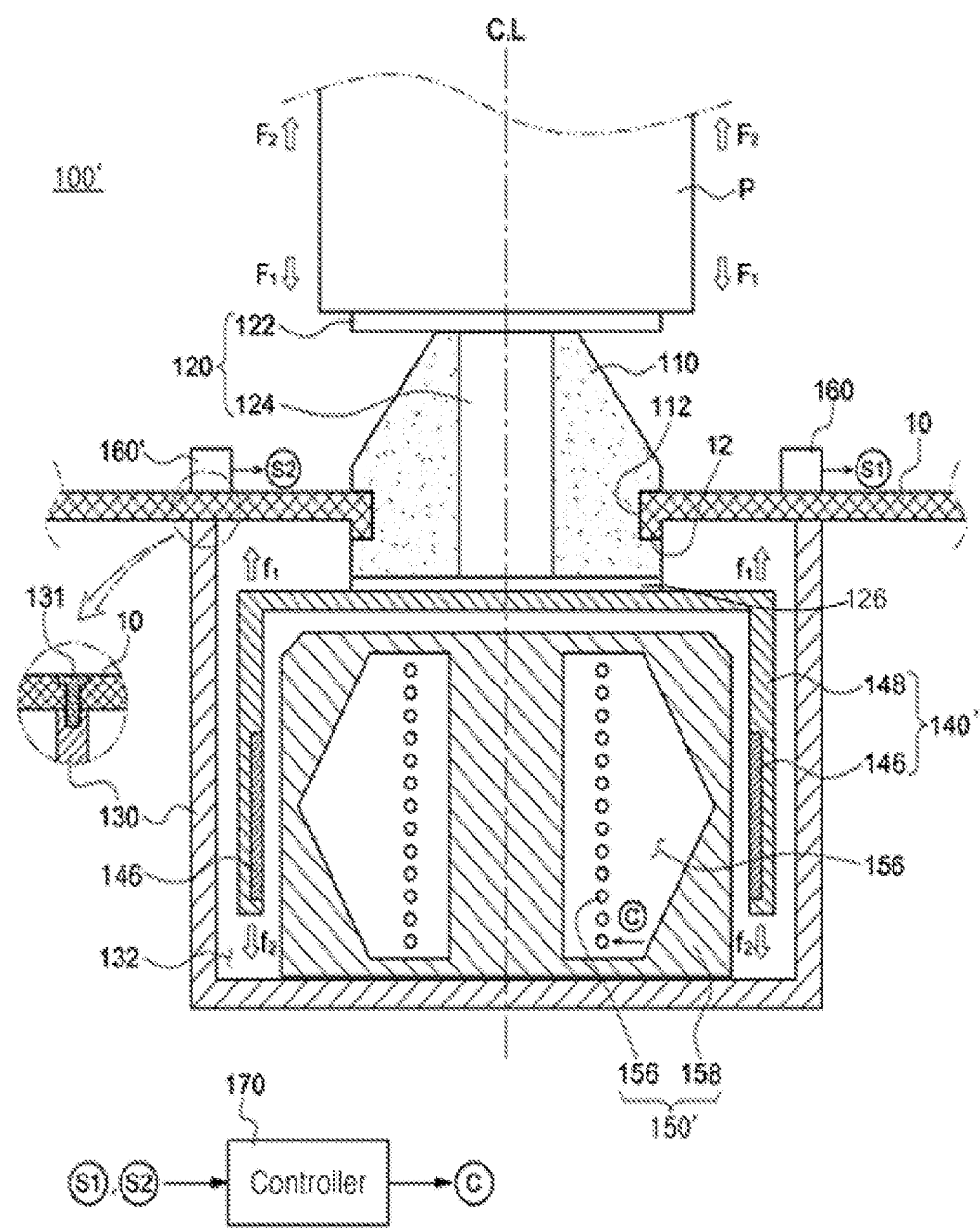
FIG. 6 is a schematic cross-sectional view of an active control type of vibration absorbing device according to a second exemplary embodiment of the present invention.
Figure 7:
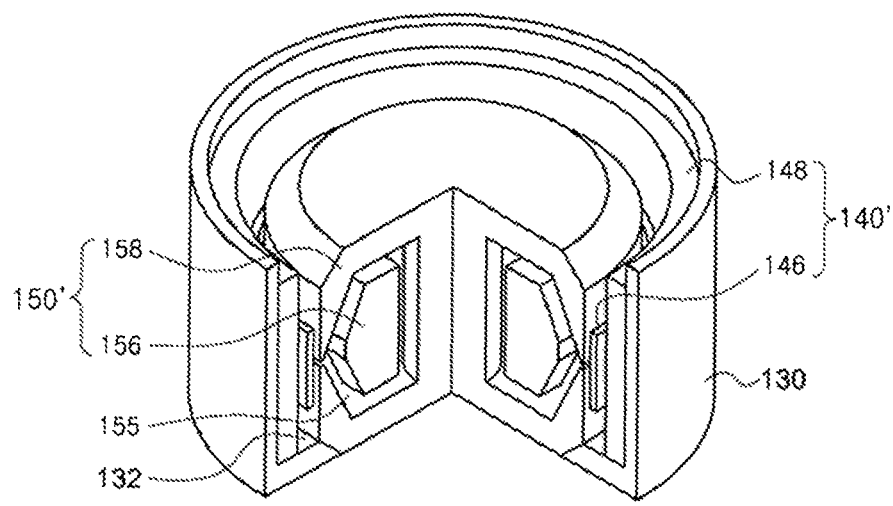
FIG. 7 is a schematic view of an alignment structure of a permanent magnet body and a solenoid coil body in the active control type of vibration absorbing device according to the second exemplary embodiment of the present invention.

FIG. 6 is a schematic cross-sectional view of an active control type of vibration absorbing device according to the second exemplary embodiment of the present invention. FIG. 7 is a schematic view of alignment of the permanent magnet body and the solenoid coil body in the active control type of vibration absorbing device according to the second exemplary embodiment of the present invention.

Referring to FIG. 6, a vibration absorbing device 100' according to the second exemplary embodiment of the present invention includes a housing 130, a first magnetic force generation member, and a second magnetic force generation member.

In this case, according to the second exemplary embodiment of the present invention, the first magnetic force generation member may be a solenoid coil body 150' and the second magnetic force generation member may be a permanent magnet body 140'.

That is, locations of the solenoid coil body 150' and the permanent magnet body 140' in the vibration absorbing device 100' according to the second exemplary embodiment of the present invention are opposite to the locations of the solenoid coil body 150 and the permanent magnet body 140 in the vibration absorbing device 100 of the first exemplary embodiment of the present invention.

In the vibration absorbing device according to the second exemplary embodiment of the present invention, a direction and a magnitude of a magnetic force of the solenoid coil body 150' are controllable to move the solenoid coil body 150' in an attenuation direction of vibration when the vibration is generated by the vibration source P.

The housing 130 is an external member disposed in a lower space of the vibration source P and having a receiving space therein. The housing 130 of the second exemplary embodiment is the same as the housing 130 of the first exemplary embodiment, and therefore no further description will be provided.

In the second exemplary embodiment of the present invention, the solenoid coil body 150' is fixed to a bottom surface, more particularly, the center CL of the bottom surface, of the receiving space 132 of the housing 130.

The solenoid coil body 150' includes a fixing member 158 and a coil 156 installed along the center of the fixing member 158.

In this case, the solenoid coil body 150' is magnetized along a direction of the current supplied through the coil 156 such that a magnetic force is generated.

FIG. 6 exemplarily illustrates the cross-sectional (particularly, internal cross-sectional) structure of the fixing member 158 and the number of windings of the coil for description of convenience, but they do not limit the scope of the present invention.

FIG. 6 and FIG. 7 illustrate that the solenoid coil body 150' (particularly, the fixing member 158) is formed in the shape of a circular cylinder, but the present invention is not limited thereto.

The permanent magnet body 140' is connected with a mount 120 to which the vibration source P is fixed in the receiving space 132 of the housing 130, and at the same time, surrounds the exterior circumferential surface of the solenoid coil body 150' such that a magnetic force of the permanent magnet can be acquired.

The permanent magnet body 140' moves up or down depending on the magnetic force generated by the solenoid coil body 150'.

That is, when the vibration generated by the vibration source P is applied in the upper direction in FIG. 6 (i.e., when a force F2 is generated), a force (i.e., f2) is generated in the permanent magnet body 140' such that the permanent magnet body 140' moves down in a direction toward the solenoid coil body 150'.

On the contrary, when the vibration generated by the vibration source P is applied to the lower direction in FIG. 6, a force (i.e., f1) is generated in the permanent magnet body 140' such that the permanent magnet body 140' moves up in a direction away from the solenoid coil body 150'.

The magnetic force of the permanent magnet body 140' maintains a constant direction. However, the direction of the magnetic force of the solenoid coil body 150' disposed opposite to the permanent magnet body 140' is changeable according to the magnitude and size of the supplied current. Therefore, a direction of a force applied to the permanent magnet can be changed according to an operation that changes a magnetic polarity between the permanent magnet and the solenoid coil.

The permanent magnet body 140' includes a permanent magnet 146 and a moving member 148 having the permanent magnet 146 in the interior circumferential surface thereof and are movable together with the vibration source P by the mount 120.

The moving member 148 surrounds the solenoid coil body 150' at a distance from the solenoid coil body 150' and covers the solenoid coil body 150' from top to bottom when moving downward.

In addition, the moving member 148 may perform the vertical movement in an upper portion of the solenoid coil body 150' in the housing 130.

The permanent magnet 146 is fixed to an inner side of the moving member 148, that is, an interior circumferential surface of the moving member 148, disposed facing the exterior circumferential surface of the solenoid coil body 150'.

In this case, a direction of the magnetic pole (i.e., directions of N and S poles) of the permanent magnet 146 is predetermined.

In the present exemplary embodiment, the S pole of the magnet 146 is set to a direction of the center C.L of the vibration absorbing device 100' and the N pole of set to the external side direction of the vibration absorbing device 100' (refer to FIG. 6 and FIG. 7).

In addition, as shown in FIG. 6 and FIG. 7, the moving member 148 has a larger interior diameter compared to an exterior diameter of the solenoid coil body 150', and has an open lower portion such that the moving member 148 can cover the solenoid coil body 150' from top to bottom.

In this case, the permanent magnet 146 is disposed in the shape of a ring-type band along an interior circumferential surface of the open lower portion of the moving member 148 such that the S pole is set in the center direction and the N pole is set in the external side direction.

The permanent magnet body 140' is fixedly connected with the vibration source P on the center axis C.L of the vibration absorbing device 100', and the mount 120 may further be connected between the permanent magnet body 140' and the vibration source P and the mount 120 may be provided with a vibration-proof member 110. The mount 120 and the vibration-proof member 110 are the same as those of the first exemplary embodiment, and therefore no further description will be provided.

The vibration absorbing device according to the second exemplary embodiment of the present invention may include sensor units 160 and 160' and a controller 170, and the sensor units 160 and 160' and the controller 170 are the same as those of the first exemplary embodiment and therefore no further description will be provided.

Next, an operation relationship for attenuating and absorbing vibration generated by the vibration source through the active control type of vibration absorbing device according to the second exemplary embodiment of the present invention will be described with reference to FIG. 8 and FIG. 9.

Figure 8:
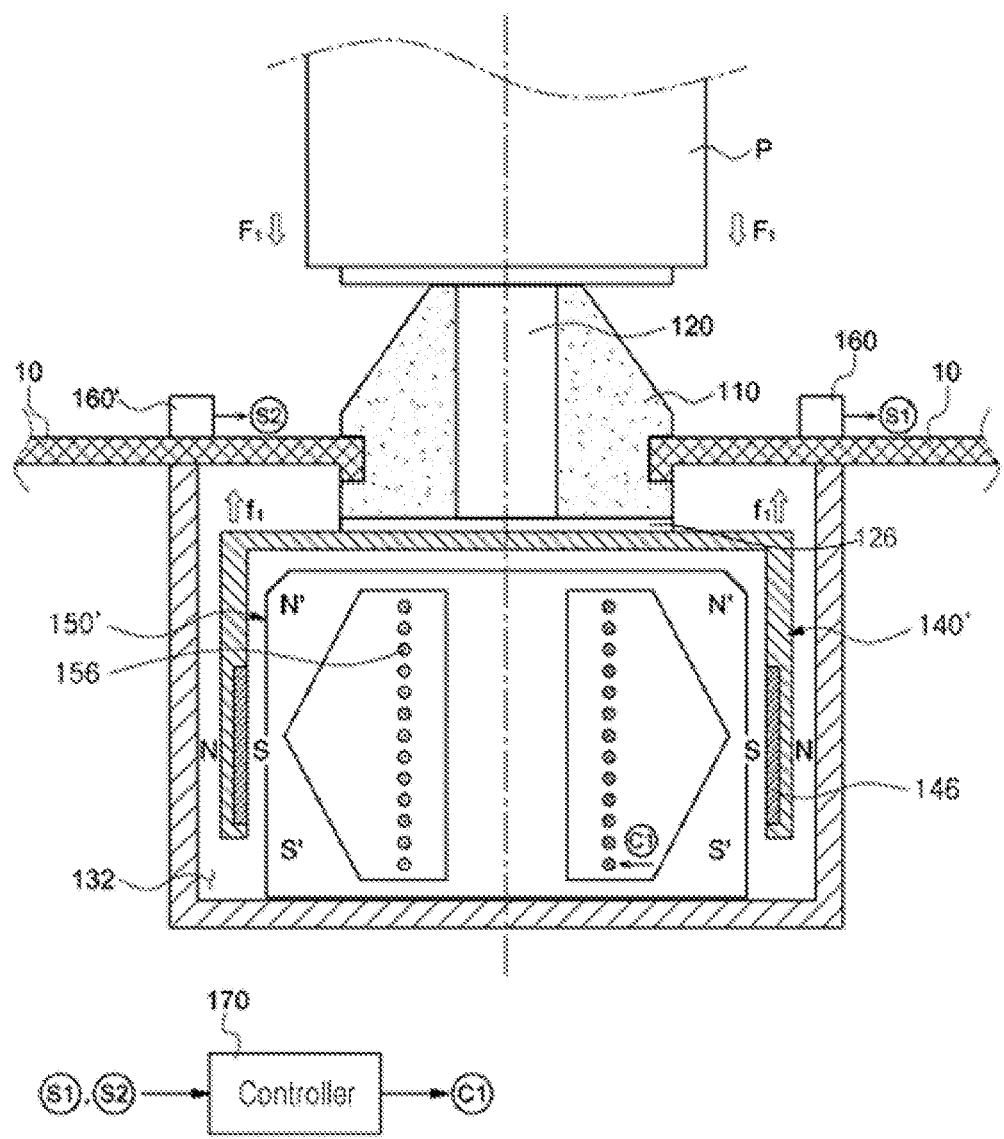
FIG. 8 is a first operation diagram illustrating the first operation of the active control type of vibration absorbing device according to the second exemplary embodiment of the present invention.

FIG. 8 is a first operation diagram illustrating the first operation of the active control type of vibration absorbing device according to the second exemplary embodiment of the present invention.

As shown in FIG. 8, when the force F1 is applied to the bottom 10 according to the vibration generated by the vibration source P, the vibration is partially absorbed through the vibration-proof member 110. Simultaneously, the force F1 (i.e., vibration or impact) is sensed through the plurality of sensor units 160 and 160'.

In this case, the sensor units 160 and 160' generate output signals 51 and S2.

The controller 170 receives the output signals 51 and S2 as feedback and applies a control command C1 to set a direction of a magnetic force of the solenoid coil body 150' to a direction for attenuating the vibration.

In addition, when the current is applied to the coil 156 side by the applied command, the lower end of the solenoid coil body 150' is magnetized as an S pole (that is, S') and the upper end of the solenoid coil body 150' is magnetized as an N pole (that is, N').

Meanwhile, in case of the permanent magnet 146 disposed opposite to the solenoid coil body 150' through the permanent magnet body 140', the inner side is set to an S pole and the outer side is set to an N pole.

That is, when the lower end of the solenoid coil body 150' is magnetized to the S pole (i.e., S'), a repulsive force is generated between the S pole of the permanent magnet 146 and the S' pole of the solenoid coil body 150' and thus the permanent magnet body 140' tends to move upward by the repulsive force, and the same force, that is, f1, is generated in the opposite direction corresponding to the force F1 generated by the vibration source P. As a result, vibration transmitted through the bottom 10 can be actively absorbed.

Figure 9:
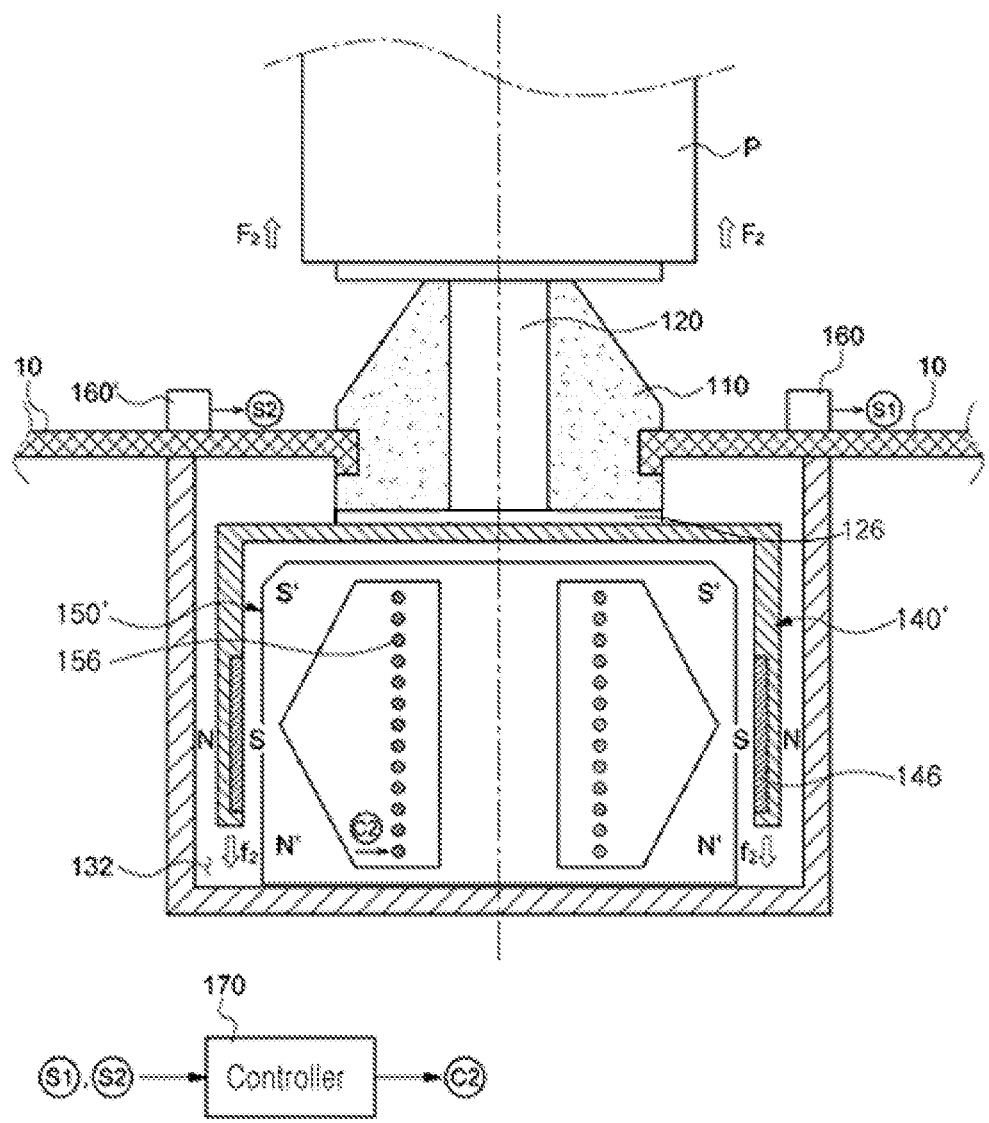
FIG. 9 is a second operation diagram illustrating realization of second operation of the active control type of vibration absorbing device according to the second exemplary embodiment of the present invention.

FIG. 9 is a second operation diagram illustrating realization of second operation of the active control type of vibration absorbing device according to the second exemplary embodiment of the present invention.

As shown in the drawing, when a force F2 is applied to the bottom 10 of the ship body according to the vibration generated by the vibration source P, the vibration is partially absorbed through the vibration-proof member 110, and at the same time, the force F2 (i.e., vibration or impact) is sensed by the plurality of sensor units 160 and 160'.

Accordingly, the sensor units 160 and 160' generate output signals S1 and S2.

The controller 170 receives the output signals S1 and S2 as feedback and applies a control command C2 to set a direction of a magnetic force of the solenoid coil body 150' to a direction for attenuating the vibration.

When the current is applied to the coil 156 side by the applied command, the lower end of the solenoid coil body 150' is magnetized as an N pole (that is, N') and the upper end of the solenoid coil body 150' is magnetized as an S pole (that is, S').

Meanwhile, in case of the permanent magnet 146 disposed opposite to the solenoid coil body 150' through the permanent magnet body 140', the inner side is set to an S pole and the outer side is set to an N pole.

That is, when the lower end of the solenoid coil body 150' is magnetized to the N' pole, an attractive force is generated between the S pole of the permanent magnet 146 and the N' pole of the solenoid coil body 150' and thus the permanent magnet body 140' tends to move downward by the attractive force, and the same force, that is, f2, is generated in the opposite direction corresponding to the force F2 generated by the vibration source P.

As a result, vibration transmitted through the bottom 10 can be actively absorbed.

As described above, the active control type of vibration absorbing device according to the exemplary embodiments of the present invention can sense vibration or impact from the vibration source in real time and promptly and actively absorb the vibration and impact.

In particular, when vibration is generated, the amount and the direction of the current supplied to the solenoid coil body are controlled so that the vibration generated by the vibration source can be actively absorbed by the interaction between the magnetic force generated by the fixed permanent magnet and the magnetic force generated the solenoid coil body movably disposed in the upper portion of the fixed permanent magnet.

Such a vibration absorbing device is provided at a lower portion of the vibration source such as a pump that causes vibration on the ship body to realize vibration attenuation.

Furthermore, the active control type of vibration absorbing device according to the exemplary embodiments of the present invention can increase use efficiency of the magnetic force generated between the permanent magnet body and the solenoid coil body through structural improvement that enables reduction of flux leakage of the permanent magnet.

In this case, the vibration absorbing device according to the exemplary embodiments of the present invention includes the housing formed in the lower portion of the bottom surface where the vibration source is installed to reduce vibration transmitted to the bottom from the vibration source and the solenoid coil body and the permanent magnet body in the housing.

However, when the vibration is generated to the left and right sides of the vibration source, the left and right side vibration of the vibration source can be reduced by installing the solenoid coil body and the permanent magnet body between the vibration source and a side wall or a support disposed in a side portion of the vibration source without having an additional housing.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A vibration absorbing device comprising:
   a housing disposed in a lower space of a bottom surface where the vibration source is installed and having a receiving space formed therein;
   the first magnetic force generation member which is fixed to a bottom of the receiving space of the housing; and
   the second magnetic force generation member which is connected to a mount fixed to a lower side of the vibration source,
   wherein the mount comprises:
   a supporting member supporting the vibration source and fixing the location of the vibration source; and
   an axis member extended to the second magnetic force generation member from a lower side of the supporting member and coupled to the second magnetic force generation member,
   wherein the axis member is extended to the receiving space side of the housing while penetrating the bottom surface where the vibration source is installed,
   and
   wherein, when vibration is generated by the vibration source, the direction and magnitude of a magnetic force of one of the first magnetic force generation member and the second magnetic force generation can be controlled such that the second magnetic force generation member can move in a direction for attenuating the vibration of the vibration source.

2. The vibration absorbing device of claim 1, wherein the first magnetic force generation member is disposed in the center of the receiving space, and the second magnetic force generation member is disposed in the exterior circumferential portion of the first magnetic force generation member.

3. The vibration absorbing device of claim 2, wherein the first magnetic force generation member is formed in the shape of a circular cylinder, the second magnetic force generation member is formed in the shape of a ring, and the first magnetic force generation member and the second magnetic force generation member are disposed on the same center axis.

4. The vibration absorbing device of claim 3, wherein one of the first magnetic force generation member and the second magnetic force generation member is a permanent magnet body and the other is a solenoid coil body.

5. The vibration absorbing device of claim 4, comprising:
   sensor units sensing vibration generated by the vibration source and outputting signals; and
   a controller receiving the signals output from the sensor units as feedback and controlling the magnitude and direction of the current supplied to the solenoid coil body.

6. The vibration absorbing device of claim 1, comprising a cylinder-shaped moving member having a ring-shaped cross-section, and the moving member is coupled to a lower side of the axis member and having the second magnetic force generation member installed in the interior circumferential surface thereof.

7. The vibration absorbing device of claim 6, further comprising a guide member disposed in the interior circumference side of the housing to guide the moving member that vertically moves through the receiving space.

8. The vibration absorbing device of claim 1, comprising a vibration-proof member provided in the mount to absorb vibration generated by the vibration source.

9. The vibration absorbing device of claim 8, wherein the vibration-proof member is fixed by being inserted between the bottom surface where the vibration source is installed and the axis member.

10. The vibration absorbing device of claim 9, wherein the vibration-proof member is formed in the shape of a cylinder of which a cross-section is formed in the shape of a ring to surround the axis member.

11. The vibration absorbing member of claim 10, wherein a ring-shaped fixing groove is formed in the exterior circumferential surface of the vibration-proof member and one side of the bottom surface is fixedly inserted to the fixing groove.

* * * * *